United States Patent
Mohtadi et al.

(10) Patent No.: US 10,910,672 B2
(45) Date of Patent: *Feb. 2, 2021

(54) HIGH CONCENTRATION ELECTROLYTE FOR MAGNESIUM BATTERY HAVING CARBORANYL MAGNESIUM SALT IN MIXED ETHER SOLVENT

(71) Applicant: Toyota Motor Engineering & Manufacturing North America, Inc., Erlanger, KY (US)

(72) Inventors: Rana Mohtadi, Northville, MI (US); Oscar Tutusaus, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,997

(22) Filed: Apr. 3, 2017

(65) Prior Publication Data

US 2018/0151917 A1 May 31, 2018

Related U.S. Application Data

(60) Provisional application No. 62/427,070, filed on Nov. 28, 2016.

(51) Int. Cl.
| | | |
|---|---|---|
| *H01M 10/0568* | (2010.01) | |
| *H01M 4/134* | (2010.01) | |
| *H01M 4/38* | (2006.01) | |
| *H01M 10/054* | (2010.01) | |
| *H01M 10/0569* | (2010.01) | |

(52) U.S. Cl.
CPC ....... *H01M 10/0568* (2013.01); *H01M 4/134* (2013.01); *H01M 4/381* (2013.01); *H01M 10/054* (2013.01); *H01M 10/0569* (2013.01); *H01M 2300/0037* (2013.01)

(58) Field of Classification Search
CPC .. H01M 4/134; H01M 4/381; H01M 10/0568; H01M 10/054; H01M 10/0569; H01M 2300/037
See application file for complete search history.

(56) References Cited

U.S. PATENT DOCUMENTS

| | | | |
|---|---|---|---|
| 3,305,569 A | 2/1967 | Skoog | |
| 3,458,580 A | 7/1969 | Grafstein | |
| 4,397,925 A | 8/1983 | Magahed | |
| 4,448,856 A | 5/1984 | Zuckerbrod et al. | |
| 4,808,282 A | 2/1989 | Thomas | |
| 5,145,752 A | 9/1992 | Goldstein et al. | |
| 5,273,840 A * | 12/1993 | Dominey ................ | C07C 49/16 252/62.2 |
| 5,714,279 A | 2/1998 | Zajac, Jr. et al. | |
| 6,013,393 A | 1/2000 | Taniuchi et al. | |
| 6,316,141 B1 | 11/2001 | Aurbach et al. | |
| 6,383,688 B1 | 5/2002 | Inagaki et al. | |
| 7,419,623 B2 | 9/2008 | Ivanov et al. | |
| 7,927,507 B1 | 4/2011 | Li et al. | |
| 8,318,354 B2 | 11/2012 | Muldoon et al. | |
| 8,703,329 B2 | 4/2014 | Barbarich et al. | |
| 9,240,613 B2 * | 1/2016 | Mohtadi ............... | H01M 4/381 |
| 9,252,458 B2 * | 2/2016 | Mohtadi ........... | H01M 10/0568 |
| 9,431,678 B2 | 8/2016 | Tutusaus et al. | |
| 9,455,473 B1 | 9/2016 | Mohtadi et al. | |
| 2002/0110739 A1 | 8/2002 | McEwen et al. | |
| 2004/0002002 A1 | 1/2004 | Mizuta et al. | |
| 2005/0016840 A1 | 1/2005 | Petillo | |
| 2005/0164093 A1 | 7/2005 | Otsuki et al. | |
| 2007/0048605 A1 | 3/2007 | Pez et al. | |
| 2009/0023074 A1 | 1/2009 | Matsui et al. | |
| 2009/0202915 A1 * | 8/2009 | Modeki ................ | H01M 4/134 429/246 |
| 2010/0021799 A1 | 1/2010 | Rieke | |
| 2010/0141211 A1 | 6/2010 | Yazami | |
| 2011/0076572 A1 | 3/2011 | Amine et al. | |
| 2011/0117440 A1 | 5/2011 | Maekawa et al. | |
| 2011/0229772 A1 | 9/2011 | Fujinami et al. | |
| 2012/0107698 A1 | 5/2012 | Muldoon et al. | |
| 2012/0114979 A1 | 5/2012 | Kim et al. | |
| 2012/0196182 A1 | 8/2012 | Yao et al. | |
| 2013/0022875 A1 | 1/2013 | Tojigamori et al. | |

(Continued)

FOREIGN PATENT DOCUMENTS

| | | |
|---|---|---|
| CN | 104183866 A | 12/2014 |
| CN | 102584878 B | 8/2015 |

(Continued)

OTHER PUBLICATIONS

Amir et al., "Progress in non aqueous magnesium electrochemistry," Journal of Power Sources, 174, pp. 1234-1240 (2007).
Muldoon et al., "Electrolyte roadblocks to a magnesium rechargeable battery", Energy Environ. Sci., 5, pp. 5941-5950 (2012).
Korbe et al., "Chemistry of the Carba-closo-dodecaborate(−) Anion, CB11H12−", Chem. Rev., 106, pp. 5208-5249 (2006).
Plesek et al., "Potential Applications of the Boron Cluster Compounds," Chem. Rev., 92, pp. 269-278 (1992).
Guo et al., "Boron-based electrolyte solutions with wide electrochemical windows for rechargeable magnesium batteries," Energy Environ. Sco, 5, pp. 9100-9106 (2012).

(Continued)

*Primary Examiner* — Maria Laios
(74) *Attorney, Agent, or Firm* — Christopher G. Darrow; Darrow Mustafa PC

(57) ABSTRACT

Electrochemical devices and processes for forming them include an anode having magnesium, a cathode, and an electrolyte in contact with the anode and the cathode. The electrolyte includes a carboranyl magnesium salt and a mixed ether solvent in which the carboranyl magnesium salt is dissolved. The mixed ether solvent includes a first ether solvent and a second ether solvent that is different from the first ether solvent.

16 Claims, 2 Drawing Sheets

(56) References Cited

U.S. PATENT DOCUMENTS

| | | | |
|---|---|---|---|
| 2013/0034780 A1 | 2/2013 | Muldoon et al. | |
| 2013/0108924 A1 | 5/2013 | Nakayama et al. | |
| 2013/0316249 A1 | 11/2013 | Higashi et al. | |
| 2014/0038037 A1 | 2/2014 | Mohtadi et al. | |
| 2014/0038061 A1 | 2/2014 | Mohtadi et al. | |
| 2014/0099557 A1* | 4/2014 | Doe | H01M 10/054 429/328 |
| 2014/0154592 A1 | 6/2014 | Mohtadi et al. | |
| 2014/0302400 A1 | 10/2014 | Shao et al. | |
| 2014/0349178 A1* | 11/2014 | Mohtadi | H01M 10/0568 429/200 |
| 2014/0349199 A1* | 11/2014 | Mohtadi | H01M 4/381 429/337 |
| 2015/0072250 A1 | 3/2015 | Mohtadi | |
| 2015/0229000 A1 | 8/2015 | Shao et al. | |
| 2015/0311565 A1 | 10/2015 | Muldoon et al. | |
| 2015/0325881 A1 | 11/2015 | Mohtadi | |

FOREIGN PATENT DOCUMENTS

| | | | |
|---|---|---|---|
| DE | 102014106976 A1 | 4/2015 | |
| JP | 2007269510 A1 | 10/2007 | |
| JP | 2011122202 A1 | 6/2011 | |
| JP | 2013073839 A1 | 4/2013 | |
| JP | 2013131366 A1 | 7/2013 | |
| JP | 2014229620 A | 12/2014 | |
| JP | 2015041572 A | 3/2015 | |
| JP | 2015523703 A | 8/2015 | |
| JP | 2016018667 A1 | 2/2016 | |
| JP | 2016119307 A1 | 6/2016 | |
| WO | 1996031519 A1 | 10/1996 | |
| WO | 2011131959 A1 | 10/2011 | |
| WO | 2013056185 A1 | 4/2013 | |
| WO | 2014031373 A1 | 2/2014 | |
| WO | WO-2017024023 A1 * | 2/2017 | H01M 4/58 |

OTHER PUBLICATIONS

Aurbach et al., "Prototype systems for rechargeable magnesium batteries," Nature, vol. 407, 5 pages (2000).

Shelly et al., ".eta.1-Benzene Coordination: The Synthesis and X-ray Crystal Structure of a Novel Silver Salt of the Weakly Coordinating Carborane Anion B11CH12–", J. Am. Chem. Soc. 107, pp. 5955-5959 (1985).

Carter et al., "Boron Clusters as Highly Stable Magnesium-Battery Electrolytes," Angew. Chem. Int. Ed., 53, pp. 3173-3177 (2014).

"Boron hydride chemistry," New York: Academic Press, Muetterties, E. L. (ed.), 8 pages (1975).

Dymon, J. et al., "Designing ionic liquids with boron cluster anions: alkylpyridinium and imidazolium [nido-C2B9H11] and [closo-CB11H12] carborane salts," Dalton Trans., pp. 2999-3006 (2008).

Gao et al., "A Carbonium Pseudo Ionic Liquid with Excellent Extractive Desulfurization Performance," AIChE Journal, vol. 59, No. 3, pp. 948-958 (Mar. 2013).

Ha, S. et al., "Magnesium(II) Bis(trifluoromethane sulfonyl) Imide-Based Electrolytes with Wide Eletrochemical Windows for Rechargeable Magnesium Batteries", ACS Applied Materials & Interfaces, 6, pp. 4063-4073 (2014).

Higashi, S. et al., "A novel inorganic solid state ion conductor for rechargeable Mg batteries," Chem. Commun., 50, 1320-1322 (2014).

"Boron Science, New Technologies and Applications", edited by N.S. Hosmane, CRC Press 2011, Print ISBN: 978-1-4398-2662-1, 5 pages.

Jenne, C. et al., Alkoxy substituted halogenated closododecaborates as anions for ionic liquids, Dalton Trans., 44, pp. 13119-13124 (2015).

Kar, M. et al., "Ionic liquid electrolytes for reversible magnesium electrochemistry", Chem. Comm., 52, pp. 4033-4036 (2016). (Uploaded in 4 parts).

Larsen, A. et al., "Designing Ionic Liquids: Imidazolium Melts with Inert Carborane Anions", J. Am. Chem. Soc., 122, pp. 7264-7272 (2000).

Liu, S. et al., "Carborane-Derivatized Low-Melting Salts with Ether-Functionalized Cations—Preparation and Properties," Euro. J. Inorg. Chem., pp. 1910-1920 (2011).

MacFarlane, D., et al., "Energy applications of ionic liquids," Energy Environ. Sci., vol. 7, No. 1, pp. 232-250 (2014).

Mohtadi et al., "Magnesium Borohydride: From Hydrogen Storage to Magnesium Battery", Angew. Chem. Int. Ed. 51, pp. 9780-9783 (2012).

Mohtadi, R. et al., "Magnesium batteries: Current state of the art, issues and future perspectives," Beilstein J. Nanotechnol. 5, pp. 1291-1311 (2014).

Nieuwenhuyzen et al., "Ionic Liquids Containing Boron Cluster Anions", Inorg. Chem., 48, pp. 889-901 (2009).

Tutusaus, O. et al., "Paving the Way Towards Highly Stable and Practical Electrolytes for Rechargeable Magnesium Batteries", ChemElectroChem, 2(1), pp. 51-57 (2015).

Pommerin et al., "Influence of the Ball Milling Conditions on the Preparation of Rare Earth Aluminum Hydrides", Scripta Materialai, 63, pp. 1128-1131 (2010).

Tutusaus, O. et al., "An Efficient Halogen-Free Electrolyte for Use in Rechargeable Magnesium Batteries", Angew. Chem. Int. Ed., 54, pp. 7900-7904 (2015).

Yoo, H.D. et al., "Mg rechargeable batteries: an on-going challenge," Energy Environ. Sci., 6, pp. 2265-2279 (2013).

Zhou N., et al., "Investigations on a series of novel ionic liquids containing the [closo-B12Cl12]22 dianion", RSC Advances, 2, pp. 9830-9838 (2012).

\* cited by examiner

HIGH CONCENTRATION ELECTROLYTE FOR MAGNESIUM BATTERY HAVING CARBORANYL MAGNESIUM SALT IN MIXED ETHER SOLVENT

CROSS-REFERENCE TO RELATED APPLICATIONS

This application claims the benefit of U.S. Provisional Application No. 62/427,070, filed Nov. 28, 2016.

TECHNICAL FIELD

The present disclosure generally relates to electrochemical cells having electrolytes with mixed ether solvent and, more particularly, to magnesium batteries having electrolytes with carboranyl magnesium salts dissolved in such solvents.

BACKGROUND

Carboranyl magnesium salts are compatible with magnesium anodes and have high electrochemical stability when incorporated into magnesium batteries. Thus these salts form the basis of very promising magnesium electrolytes. However, in some instances, carboranyl magnesium salts have lower solubility than is desired in electrochemically compatible solvents. The carboranyl anion of a carboranyl magnesium salt can be rationally functionalized to improve solubility, but this can be economically unfavorable. In some instances, solubility can be improved by employing a large molecular weight, multidentate ethereal solvent. However, such solvents typically have high viscosity, lowering magnesium ion conductivity and thus deteriorating electrolyte performance.

Accordingly, there exists a need for an improved electrolyte that uses a carboranyl magnesium salt and achieves solubility necessary to provide high ionic conductivity at the lowest possible cost.

SUMMARY

Disclosed, in various non-limiting embodiments, are electrochemical devices having a mixed ether solvent electrolyte and a process of forming these electrochemical devices.

In one embodiment, provided herein is an electrochemical device which includes an anode having magnesium, a cathode and an electrolyte in contact with the anode and the cathode. The electrolyte includes a carboranyl magnesium salt and a mixed ether solvent in which the carboranyl magnesium salt is dissolved. The mixed ether solvent includes a first ether solvent and a second ether solvent that is different from the first ether solvent.

In yet another embodiment, provided herein is a process for preparing an electrochemical device. The process includes a step of connecting an anode having magnesium and a cathode via an external electrically conductive structure, and a step of contacting the anode and cathode with an electrolyte. The electrolyte includes a carboranyl magnesium salt and a mixed ether solvent in which the carboranyl magnesium salt is dissolved. The mixed ether solvent includes a first ether solvent and a second ether solvent that is different from the first ether solvent.

These and other features of the electrochemical device having a carboranyl magnesium electrolyte, and the process for making the same, will become apparent from the following detailed description when read in conjunction with the figures and examples, which are exemplary, not limiting. The carboranyl magnesium electrolyte as described can be employed alone or in combination with other electrolyte materials.

BRIEF DESCRIPTION OF THE DRAWINGS

For a better understanding of the processes and devices having a carboranyl magnesium electrolyte, with regard to the particular variations and examples discussed herein, reference is made to the accompanying figures, in which.

DETAILED DESCRIPTION

Figure 1:
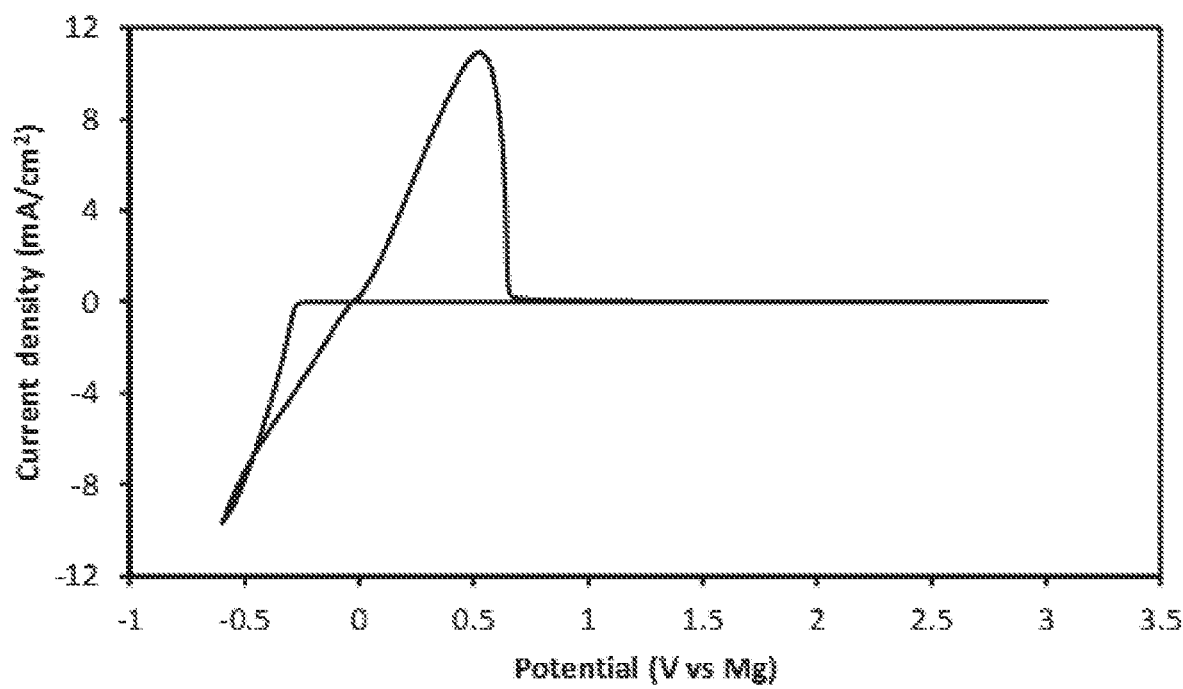
FIG. 1 is a cyclic voltammogram of a platinum (Pt) working electrode in contact with 0.35 molal $Mg(CB_{11}H_{12})_2$ in tetraethylene glycol dimethyl ether (tetraglyme), the voltammogram performed at a scan rate of 5 mV/s.

The present disclosure provides electrochemical devices having electrolytes that include carboranyl magnesium salts. Carboranyl magnesium salts are capable of mediating reversible magnesium deposition at a magnesium anode, while being relatively non-corrosive and oxidatively stable at the cathodic current collector in a manner previously shown for non-carboranyl magnesium containing electrolytes. The electrolytes of the present technology may be functionalized on the carboranyl anion with one or more moieties.

The carboranyl magnesium salts can thus be particularly beneficial for use as electrolytes in magnesium batteries having a cathodic current collector made of non-noble metals such as stainless steel. The presently disclosed carboranyl magnesium salts combine the properties of electrochemical compatibility with reversible and repeated magnesium deposition at the magnesium anode, lack of corrosiveness at the cathodic current collector, and high enough solubility to provide high ionic conductivity and enhanced cycling rate performance.

Accordingly, provided herein is an electrochemical device that includes an anode; a cathode; and a mixed-solvent carboranyl electrolyte in contact with the anode and the cathode. In general, the mixed-solvent carboranyl magnesium electrolyte (referred to alternatively herein simply as "the electrolyte") will contain a carboranyl magnesium salt having at least one magnesium cation ($Mg^{2+}$) and at least one carboranyl anion per stoichiometric unit. In some instances, the carboranyl magnesium salt will have a formula:

 $Mg(CB_iH_{[(i+1)-j-k]}X_jR_k)_2$, Formula I:

 $Mg(C_2B_{(i-1)}H_{(i-j-k)}X_jR_k)_2$, Formula II:

 $Mg(CB_iH_{[(i+1)-j-k]}X_jR_k)X$, Formula III:

 $Mg(C_2B_{(i-1)}H_{(i-j-k)}X_jR_k)X$, or Formula IV:

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities. In many implementations, j, k or j+k will be equal to or lower than 2. In some implementations, at least on of j and k will be equal to or lower than 7. In some particular implementations, j, k, or both will be equal to zero. In some particular implementations, j will be equal to 11.

As used herein, the term "alkyl" refers to a branched or straight-chain alkyl group having 1 to 18 carbons (C1-C18) which can optionally be partially or completely fluorinated. The term "aryl" as used herein refers to an aromatic hydrocarbon group having 6 to 14 carbons (C6-14), such as phenyl or naphthyl. An aryl can also optionally be partially or completely fluorinated. The term "alkoxy" as used herein refers to group having a formula —$OR_{alk}$ where $R_{alk}$ is an alkyl as defined above. An alkoxy group can optionally be partially or completely fluorinated. The term "aryloxy" as used herein refers to a group having a formula —$OR_{aryl}$, where $R_{aryl}$ is an aryl group as defined above. An aryloxy group can optionally be partially or completely fluorinated.

Generally, the carboranyl anion, represented above as any of Formulae I-IV, will be an anion of a closo-carborane. In some instances, it will be an anion of an icosahedral-closo-carborane, wherein the cumulative number of carbon and boron atoms, exclusive of H, X, and R groups, is 12.

In some implementations of the disclosed electrochemical device in which the carboranyl magnesium salt is a salt according to Formulae I-IV, R can be covalently attached to the carbon of the carboranyl anion. In some implementations wherein the carboranyl magnesium salt is a salt according to Formula I-IV, R can be alkyl. In some such implementations, R can be methyl, ethyl, propyl, butyl, pentyl or hexyl.

In some implementations of the disclosed electrochemical device in which the carboranyl magnesium salt is a salt according to Formulae I-IV, X can be covalently attached to the boron of the carboranyl anion. In some implementations wherein the carboranyl magnesium salt is a salt according to Formula I-IV, j can be 1, 6 or 11.

The mixed solvent carboranyl electrolyte will further include a mixed solvent system in which the carboranyl magnesium salt is dissolved. The mixed solvent system includes a first ether solvent and a second ether solvent that is different from the first ether solvent. Each of the first and second ether solvents can be any ether solvent capable of solubilizing or partially solubilizing the carboranyl magnesium salt under normal operating conditions for the associated electrochemical device. Non-limiting examples of ether solvents that are suitable for use as either the first ether solvent, the second ether solvent, or both, include: tetrahydrofuran (THF), 1,2-dimethoxyethane (glyme), bis(2-methoxyethyl) ether (diglyme), triethylene glycol dimethyl ether (triglyme), tetraethylene glycol dimethyl ether (tetraglyme), or any other ethereal solvent capable of promoting partial solubilization of the carboranyl magnesium salt employed and suitable to the configuration and requirements of the electrochemical device. In certain embodiments, the carboranyl magnesium salt will have solubility in either or both of the first and second ether solvents of at least 0.001 molal at 25° C. and atmospheric pressure.

In some embodiments, at least one of the first or the second ether solvents will have viscosity less than 2 cP, or less than 1 cP, under standard conditions of 25° C. and atmospheric pressure. In some embodiments, the mixed ether solvent will have viscosity less than 2 cP under standard conditions of 25° C. and atmospheric pressure.

It will be understood that carboranyl magnesium salts generally have greater molal solubility in ether solvents containing a larger number of oxygens, which have greater viscosity, than their solubility in ether solvents containing lower number of oxygens and having low viscosity. On the other hand, magnesium ion mobility, and thus conductivity, will generally be higher in low viscosity solvents. With reference to Table I below, it has been discovered that mixed ether solvents of the present disclosure generally provide high carboranyl magnesium salt solubility, even in instances where each of the first and second ether solvents provide low solubility, individually. Table I shows the solubility of $Mg(CB_{11}H_{12})_2$ in various single or mixed ether solvents, where DME refers to 1,2-dimethoxyethane, G2 refers to diglyme, G3 refers to triglyme, and G4 refers to tetraglyme. Table I also shows the measured or estimated viscosity for the various single or mixed ether solvents.

TABLE I

Solubility of $Mg(CB_{11}H_{12})_2$ in various solvents or mixture of solvents at 25° C.

|  | Solubility (molal) | Solvent viscosity (cP) |
|---|---|---|
| THF | <0.004 | 0.46 |
| DME | 0.008 | 0.42 |
| G2 | 0.015 | 0.94 |
| G3 | >1 | 1.96 |
| G4 | >1 | 3.3 |
| THF/DME (1:1) | 0.37 | 0.44[a] |
| THF/G2 (1:1) | 0.82 | 0.59[a] |
| DME/G2 (1:1) | 0.55 | 0.58[a] |

[a]Estimated.

It can be seen, for instance, that a 1:1 weight ratio of THF:DME provides solubility nearly 50× greater than that of DME alone, and nearly 100× greater than that of THF alone. It can also be seen that solubility in 1:1 weight ratio of THF:G2 is comparable to that of G3 or G4 alone, but viscosity of 1:1 weight ratio of THF:G2 is reduced by about 70% and 82% with respect to G3 and G4 alone, respectively.

Additionally, as can be seen with reference to Table II, the mixed ether solvent in all cases provides ionic conductivity substantially greater than that of either the first ether solvent or second ether solvent alone.

TABLE II

Maximum ionic conductivity obtained with solutions of $Mg(CB_{11}H_{12})_2$.

|  | Solvent viscosity (cP) | Maximum ionic conductivity (mS/cm) | Concentration at max. conductivity (molal) |
|---|---|---|---|
| G4 | 3.3 | 1.3 | 0.43 |
| THF/G2 (1:1) | 0.59[a] | 5.7 | 0.63 |
| DME/G2 (1:1) | 0.58[a] | 6.1 | 0.52 |

[a]Calculated.

Thus it can be seen, for example, that the mixed ether solvents having THF:G2 or DME:G2 at a 1:1 weight ratio have maximum ionic conductivity nearly 5-fold greater than that of tetraglyme. Without being bound to any particular theory, it is believed that the substantially greater ionic conductivity of the mixed ether solvent is mainly due to the low viscosity of the mixed ether solvent. For example, and with reference to Tables I and II, it can be seen that the 1:1 mixtures of THF:G2 have carboranyl magnesium solubility comparable to that of the larger glymes, while having far lower viscosity.

In various implementations, the carboranyl magnesium salt will be present in the mixed ether solvent at a concentration of at least 0.1 molal, or at least 0.25 molal, or at least 0.5 molal. In some implementations, the mixed solvent electrolyte will have a magnesium ion conductivity greater than 1 mS/cm, or greater than 3 mS/cm, or greater than 6 mS/cm.

An electrochemical device according to the present disclosure and having an electrolyte which includes a carboranyl magnesium salt will, in many implementations, be a magnesium battery wherein a reduction/oxidation reaction according to Reaction A occurs:

$$Mg^0 \leftrightarrow Mg^{2+} + 2e^- \qquad \text{A.}$$

In many implementations, the electrochemical device will be a secondary battery or a subunit of a secondary battery. In such implementations, it is to be understood that the term "anode" as used herein refers to an electrode at which magnesium oxidation occurs during device discharge and at which magnesium reduction occurs during device charge. Similarly, it is to be understood that the term "cathode" refers in such implementations to an electrode at which a cathode material reduction occurs during device discharge and at which a cathode material oxidation occurs during device charge.

In such implementations, the anode can comprise any material or combination of materials effective to participate in electrochemical oxidation of magnesium during a device discharge. Similarly, the anode can comprise any material or combination of materials effective to participate in electrochemical reduction of magnesium cations and to incorporate reduced magnesium during a device charging event. In some implementations, the anode can consist essentially of elemental magnesium (i.e. magnesium atoms having no formal charge) or comprise at least one surface layer of elemental magnesium. In other implementations, the anode can comprise a magnesium-containing alloy and/or an insertion-type magnesium electrode such as a tin electrode, containing magnesium in complex or alloy with other materials to the extent the cell is charged.

The cathode can comprise any material or combination of materials effective to participate in electrochemical insertion of a cathode material during a device discharge. Similarly, the cathode can comprise any material or combination of materials effective to participate in electrochemical extraction of said cathode material during a device charging event. In some variations, the cathode material that is inserted at the cathode during a device discharge and extracted from the cathode during device charging event can comprise magnesium. Suitable but non-exclusive examples of cathode materials can include a Chevrel phase molybdenum composition such as $Mo_6S_8$, $FeSiO_4$ (reversibly $MgFeSiO_4$), $MnO_2$, $MgFePO_4$, sulfur, organosulfur compounds, an organic cathode material such as poly(2,2,6,6-tetramethyl-piperidinyl-1-oxy-4-yl methacrylate) (PTMA), air or any other suitable materials.

The electrochemical device can additionally include at least one external conductor, configured to enable electrical communication between the anode and the cathode. In a simple implementation, the at least one external conductor can be a single conductor such as a wire connected at one end to the anode and at an opposite end to the cathode. In other implementations, the at least one external conductor can include a plurality of conductors putting the anode and the cathode in electrical communication with a power supply device configured to apply an electric potential to the electrochemical device during a charging event, with other electrical devices situated to receive power from the electrochemical device, or both.

Figure 2:
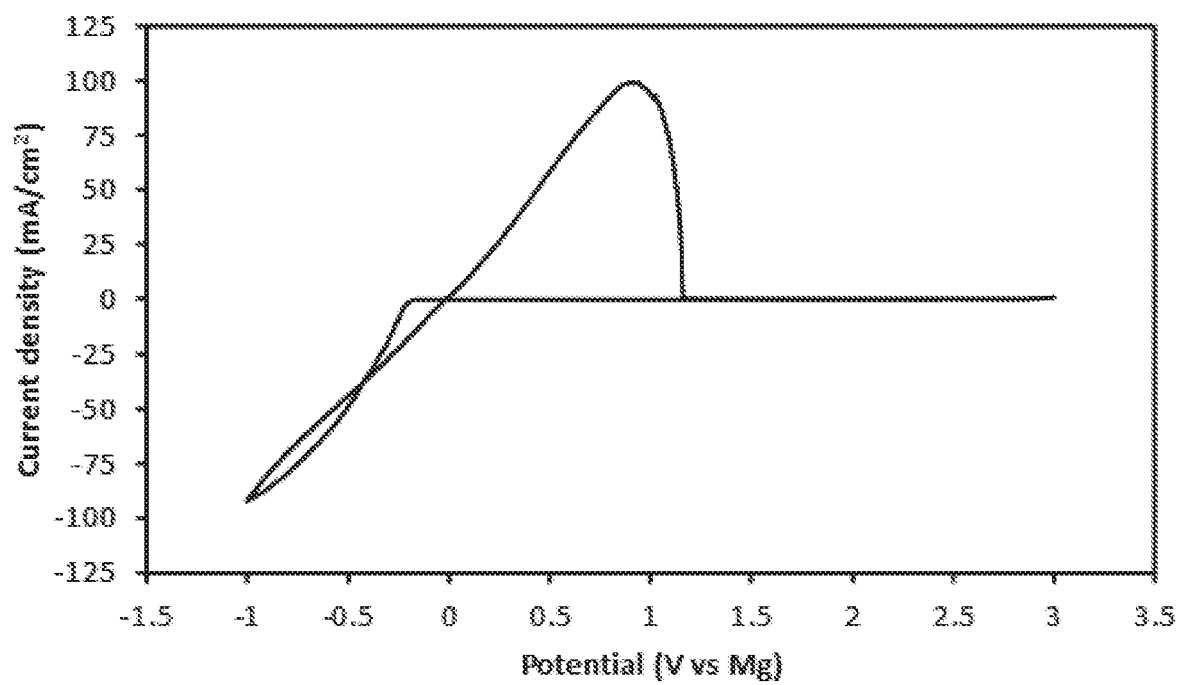
FIG. 2 is a cyclic voltammogram of a Pt working electrode in contact with 0.50 molal $Mg(CB_{11}H_{12})_2$ in a mixed ether solvent of the present disclosure, having a 1:1 weight ratio of 1,2-dimethoxyethane:diglyme, the voltammogram performed at a scan rate of 35 mV/s.
Figure 3:
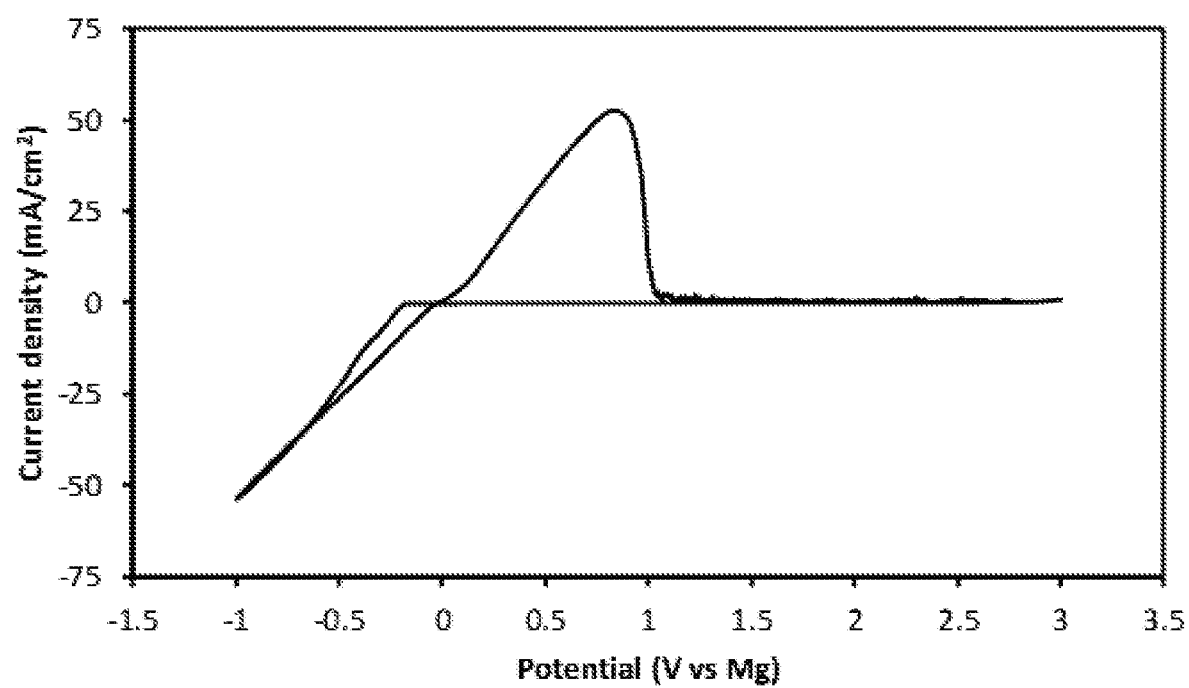
FIG. 3 is a cyclic voltammogram of a Pt working electrode in contact with 0.54 molal $Mg(CB_{11}H_{12})_2$ in a mixed ether solvent of the present disclosure, having a 1:1 weight ratio of tetrahydrofuran:diglyme, the voltammogram performed at a scan rate of 35 mV/s.

FIGS. 1-3 show cyclic voltammograms of electrochemical devices that are identical except in the electrolyte. FIG. 1 shows data for an electrochemical device similar to that of the present disclosure, except that the electrolyte is 0.35 molal $Mg(CB_{11}H_{12})_2$ in tetraglyme. FIGS. 2 and 3 show cyclic voltammograms of equivalent electrochemical devices, but where the electrolyte is 0.50 molal $Mg(CB_{11}H_{12})_2$ in 1:1 DME:diglyme or 0.54 molal $Mg(CB_{11}H_{12})_2$ in 1:1 THF:diglyme, respectively. The results show that the electrochemical devices of the present disclosure (FIGS. 2-3) have maximum current density approximately 5-10 times greater than that of the electrochemical device lacking a mixed ether solvent (FIG. 1). This finding is consistent with the finding discussed earlier that the electrolytes of the present disclosure have superior ionic conductivity in comparison to previous electrolytes.

Also provided herein is a process for preparing an electrochemical device. The process includes a step of contacting an anode and a cathode with a mixed-solvent carboranyl electrolyte having a carboranyl magnesium salt, first ether solvent, and second ether solvent. The anode, the cathode, and the mixed-solvent carboranyl electrolyte are all as described above with respect to the disclosed electrochemical device. The process can include an additional step of putting the anode and the cathode into electrical communication with one another via at least one external conductor. The at least one external conductor, when present, is also as described above with reference to the electrochemical device.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1. Preparation of Electrochemical Devices and Testing Thereof

Electrochemical testing is conducted in a three-electrode BASi 4 dram shell vial placed inside an MBraun glove box at 25° C. at less than 0.1 ppm $O_2$ and $H_2O$ content. The electrodes used in all experiments are as follows: working electrode—0.02 cm² platinum disk (BASi); counter electrode—magnesium ribbon; reference electrode—magnesium wire. The working electrode is polished, sonicated, and kept in a dry vacuum oven at 80° C. prior to each experiment. The surfaces of all magnesium electrodes are thoroughly rubbed with a glass slide inside the glove box prior to use to remove any possible oxides.

Electrochemical testing is conducted using a BioLogic potentiostat and data is acquired and analyzed with EC-lab Software®.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrochemical device, comprising:
    an anode comprising magnesium;
    a cathode; and
    an electrolyte in contact with the anode and the cathode, the electrolyte comprising:
        a carboranyl magnesium salt having a $Mg^{2+}$ cation and a carboranyl anion; and
        a mixed ether solvent in which the carboranyl magnesium salt is dissolved, the mixed ether solvent having viscosity less than one centipoise (cP), and comprising:
            a first ether solvent; and
            a second ether solvent that is different from the first ether solvent;
    wherein the carboranyl magnesium salt is present at a concentration of at least 0.25 molal;
    and wherein the electrolyte has an ionic conductivity greater than 3 mS/cm.

2. The electrochemical device as recited in claim 1, wherein the carboranyl magnesium salt has a formula selected from the group consisting of:

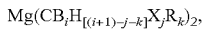

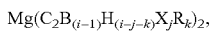

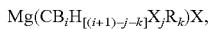

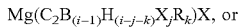

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities.

3. The electrochemical device as recited in claim 1, wherein an anion of the carboranyl magnesium salt is an icosahedral closo-carboranyl anion.

4. The electrochemical device as recited in claim 1, wherein the electrolyte is stable at an electrical potential of at least 3.0 V.

5. The electrochemical device as recited in claim 1, wherein the cathode comprises an organic cathode material.

6. The electrochemical device as recited in claim 1, wherein the carboranyl magnesium salt is present at a concentration of at least 0.8 molal.

7. The electrochemical device as recited in claim 1, wherein the first ether solvent is selected from tetrahydrofuran (THF) and 1,2-dimethoxyethane (DME).

8. The electrochemical device as recited in claim 1, wherein the second ether solvent is selected from DME, bis(2-methoxyethyl) ether (diglyme), triethylene glycol dimethyl ether (triglyme), and tetraethylene glycol dimethyl ether (tetraglyme).

9. The electrochemical device as recited in claim 1, wherein the second ether solvent is selected from bis(2-methoxyethyl) ether (diglyme), triethylene glycol dimethyl ether (triglyme), and tetraethylene glycol dimethyl ether (tetraglyme).

10. The electrochemical device as recited in claim 1, wherein the carboranyl magnesium salt is $Mg(CB_{11}H_{12})_2$ and wherein the first ether solvent is THF and second ether solvent is diglyme.

11. The electrochemical device as recited in claim 1, wherein the carboranyl magnesium salt is $Mg(CB_{11}H_{12})_2$ and wherein the first ether solvent is DME and second ether solvent is diglyme.

12. The electrochemical device as recited in claim 1, wherein the carboranyl magnesium salt has a formula selected from the group consisting of:

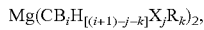

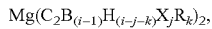

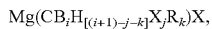

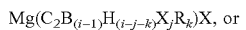

a combination of at least two of the foregoing, wherein i is 11; j is 1; k is 0; and X is fluorine, chlorine, bromine, or iodine and each R, independently of each other R, is an alkyl, aryl, alkoxy, aryloxy, their partially or completely fluorinated analogues, or a moiety combining the aforementioned functionalities.

13. A process for preparing an electrochemical device, comprising:
    contacting an anode and a cathode with an electrolyte comprising:
        a carboranyl magnesium salt present at a concentration of at least 0.25 molal and having a Mg' cation and a carboranyl anion; and
        a mixed ether solvent having viscosity less than one centipoise (cP) in which the carboranyl magnesium salt is dissolved, the mixed ether solvent comprising:
            a first ether solvent; and
            a second ether solvent that is different from the first ether solvent.

14. The process as recited in claim 13, wherein the carboranyl magnesium salt has a formula selected from the group consisting of:

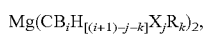

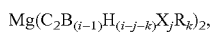

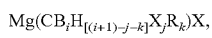

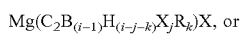

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities.

15. The process as recited in claim 13, wherein the carboranyl magnesium salt comprises an icosahedral closo-carhoranyl anion.

16. The process as recited in claim 13, wherein the electrolyte is stable at an electrical potential of at least 3.0 V.

* * * * *